United States Patent
Heusel et al.

(10) Patent No.: US 8,544,437 B2
(45) Date of Patent: Oct. 1, 2013

(54) STARTER MECHANISM HAVING A MULTI-STAGE PLUNGER RELAY

(75) Inventors: Jochen Heusel, Reutlingten (DE); Martin Neuburger, Geislingen (DE); Torsten Knorr, Vaihingen/enz (DE)

(73) Assignee: Robert Bosch GmbH, Stuttgart (DE)

( * ) Notice: Subject to any disclaimer, the term of this patent is extended or adjusted under 35 U.S.C. 154(b) by 919 days.

(21) Appl. No.: 12/594,086

(22) PCT Filed: Feb. 1, 2008

(86) PCT No.: PCT/EP2008/051285
§ 371 (c)(1), (2), (4) Date: Jan. 27, 2010

(87) PCT Pub. No.: WO2008/119577
PCT Pub. Date: Oct. 9, 2008

(65) Prior Publication Data
US 2010/0126454 A1 May 27, 2010

(30) Foreign Application Priority Data
Mar. 30, 2007 (DE) .......................... 10 2007 015 396

(51) Int. Cl.
*H01H 50/44* (2006.01)
*F02N 11/08* (2006.01)
*F16K 31/06* (2006.01)

(52) U.S. Cl.
USPC ........................................ 123/179.3; 335/256

(58) Field of Classification Search
USPC ...................................... 123/179.3; 335/256
See application file for complete search history.

(56) References Cited

U.S. PATENT DOCUMENTS

| | | | | |
|---|---|---|---|---|
| 4,686,501 A * | 8/1987 | Palmier et al. | ................. | 335/256 |
| 4,755,689 A * | 7/1988 | Porter | .......................... | 290/38 R |
| 5,239,954 A * | 8/1993 | Boegner et al. | ............ | 123/179.3 |
| 5,345,901 A * | 9/1994 | Siegenthaler et al. | ..... | 123/179.3 |
| 5,622,148 A * | 4/1997 | Xue et al. | .................. | 123/179.25 |
| 6,148,781 A * | 11/2000 | Boegner et al. | ............ | 123/179.3 |
| 6,323,562 B1 * | 11/2001 | Renner et al. | ................ | 290/38 A |
| 6,516,767 B1 * | 2/2003 | Maillet et al. | ............... | 123/179.3 |
| 6,634,332 B2 * | 10/2003 | Saito et al. | .................. | 123/179.3 |
| 6,923,152 B2 * | 8/2005 | Nagai et al. | ............... | 123/179.25 |
| 7,145,259 B2 * | 12/2006 | Spellman et al. | ........... | 290/38 R |
| 7,145,424 B2 * | 12/2006 | Schempp et al. | ............. | 335/267 |
| 7,218,010 B2 * | 5/2007 | Albertson et al. | .......... | 290/38 R |

(Continued)

FOREIGN PATENT DOCUMENTS

| | | |
|---|---|---|
| DE | 197 02 321 | 8/1998 |
| DE | 100 34 779 | 1/2002 |

(Continued)

OTHER PUBLICATIONS
International Search Report, PCT/EP2008/051285, dated Jul. 25, 2008.

*Primary Examiner* — Stephen K Cronin
*Assistant Examiner* — Arnold Castro
(74) *Attorney, Agent, or Firm* — Kenyon & Kenyon LLP (57) ABSTRACT

A plunger relay includes a movable actuating element on which a first solenoid actuator is acting in force-transmitting manner. The plunger relay has at least one second solenoid actuator, which is acting on the same movable actuating element in force-transmitting manner, and whose magnetic force is able to be set independently of the magnetic force of the first solenoid actuator.

15 Claims, 3 Drawing Sheets

(56) References Cited

U.S. PATENT DOCUMENTS

| | | | |
|---|---|---|---|
| 7,579,710 B2 * | 8/2009 | Hisamoto et al. | 307/10.6 |
| 7,665,438 B2 * | 2/2010 | Hirning et al. | 123/179.3 |
| 8,258,639 B2 * | 9/2012 | Labbe et al. | 290/38 A |
| 2002/0014216 A1 * | 2/2002 | Boegner et al. | 123/179.3 |
| 2002/0170517 A1 * | 11/2002 | Kurita | 123/179.3 |
| 2003/0070645 A1 * | 4/2003 | Osada et al. | 123/179.3 |
| 2006/0114089 A1 * | 6/2006 | Schempp et al. | 335/220 |
| 2009/0020091 A1 * | 1/2009 | Botzenhard et al. | 123/179.3 |

FOREIGN PATENT DOCUMENTS

| | | |
|---|---|---|
| DE | 101 60 300 | 6/2003 |
| DE | 103 20 729 | 11/2004 |
| DE | 10 204 032 373 | 1/2006 |
| JP | 57-40240 | 3/1982 |
| JP | 63-167639 | 11/1988 |
| JP | 10-184505 | 7/1998 |
| JP | 2002-89419 | 3/2002 |
| JP | 2005-222870 | 8/2005 |
| WO | WO 2006/120180 | 11/2006 |

* cited by examiner

STARTER MECHANISM HAVING A MULTI-STAGE PLUNGER RELAY

FIELD OF THE INVENTION

The present invention is based on a starter mechanism for internal combustion engines having a pinion-engaging relay for the controlled coupling of the electric starter with the internal combustion engine.

BACKGROUND INFORMATION

Pinion starters in which a starter pinion engages with the ring gear of the internal combustion engine by means of a solenoid actuator during the startup operation are already known. When reaching an engaged end position, i.e., when fully meshing with the ring gear of the internal combustion engine, the pinion closes a contact bridge in the solenoid actuator. By closing the contact bridge the electric starter motor is supplied with current. Once the internal combustion engine has been started, the solenoid actuator is switched off, so that the pinion disengages from the ring gear of the combustion engine and the electric starter motor is therefore no longer coupled to the internal combustion engine.

In conventional starters, the solenoid actuator is energized by the nominal current during the startup, so that a constant acceleration is induced in the pinion, and the pinion is therefore abruptly decelerated when reaching the ring gear of the internal combustion engine. Especially in the case of hybrid engines in which the combustion engine is also regularly switched on and off during the operation, the noise generation is consequently high.

To reduce the noise, DE 197 02 321 describes an energization of a solenoid switch in which the acceleration force acting on the pinion can be selectively controlled with the aid of pulse-width modulation. The control described there selectively controls the movement by varying the pulse duty factor of the supplied current in order to achieve a desired engaging movement in this manner. Because of the required high magnetic force, the frequency on which the pulse-width modulation is based must be higher than 20 kHz since the triggering of the solenoid actuator would otherwise produce noise in the audible range. Frequencies of more than 20 kHz are therefore required, which in turn require the inductivity of the plunger relay to be very low in order to permit a selective control. Such a plunger relay controlled in pulse-width modulated manner thus includes a low number of windings and a high wire cross-section in order to be able to generate the required force despite the low number of windings. At the same time, high supply currents are required.

SUMMARY

The starter mechanism according to example embodiments of the present invention allows a low-noise coupling of the starter pinion to the ring gear of the combustion engine without requiring particularly high currents and, therefore, without the need for complex power electronics. Furthermore, the starter mechanism according to example embodiments of the present invention does not require a pulse-width control, which simplifies the control considerably. The plunger relays used according to example embodiments of the present invention are not restricted to electromagnets having low inductivity; instead, windings having a high number of windings may be used, which generate a high magnetic force even at low currents.

Example embodiments of the present invention are based on the control of the output of an electromagnet, and thus its generated magnetic force, via the selection of one or a plurality of winding sections of an electromagnet.

For example, if a low magnetic force is required in a first start phase, then a portion of all winding sections is energized, and the number is increased if higher magnetic forces are required.

In general, the sum of the generated total magnetic force is achieved by complete activation or deactivation of individual winding sections, the individually generated magnetic force components being zero (deactivated), 100% (winding section is energized by nominal current) or −100% (energization of the winding section in the reverse direction). The share of the individual winding section in the overall magnetic force results from the winding number, the magnetic coupling, the geometry and the positioning relative to the magnetic section that is in force-locking connection with the actuating element. In addition, the winding direction must be taken into account as well. In general, the individual winding components of the winding sections may be added up with respect to each other provided the generated magnetic fields have the same direction, or they may partially compensate each other if at least one winding section generates a magnetic field that is opposite to the magnetic fields of the other winding sections, for example by an energization that is oppositely polarized or by an opposite winding direction.

According to example embodiments of the present invention, the magnetic forces generated by the individual magnets, i.e., by the individual winding sections, act jointly, for instance in that the magnetic forces are acting directly on the same magnetic element. As an alternative, the individual elements on which the particular solenoid actuators are acting may be connected to each other by force-locking directly or indirectly, i.e., via lever mechanisms, gears or the like, for example. Preferably, all solenoid actuators act on the same actuating element, for instance at different locations of the actuating element or, preferably, at the same location of the actuating element.

In general, the magnetic field generated by the solenoid actuators preferably is acting on a magnetic section that is connected to the actuating element in a force-transmitting manner, for instance by being realized as integral part of the actuating element. The magnetic section may include magnetic materials having a high relative magnetic permeability and/or a high premagnetization because of permanently magnetic materials, for example. It is preferred if the magnetic section is designed to be magnetically saturated only to a limited extent even when most or all of the winding sections are fully energized.

The plunger relay according to example embodiments of the present invention includes a plurality of solenoid actuators, i.e., a first and at least one second solenoid actuator. The subdivision into a plurality of solenoid actuators means an electric subdivision, so that one and the same winding is able to be subdivided into a plurality of solenoid actuators if, by way of tapping, for instance, the winding is able to be subdivided into different winding sections, which correspond to individual solenoid actuators and are able to be controlled in different manners. The subdivision into a plurality of solenoid actuators, which are controllable separately from each other, does not necessarily lead to specific physical setups. For example, two solenoid actuators may be realized by windings of a continuous wire that directly abut each other, the subdivision of the magnets being implemented by introducing a tap. As an alternative, the subdivision of the solenoid actuators may also be a physical subdivision, so that two physically separate windings are provided, each having two ends, which are controlled by additional circuits. The separation of two solenoid actuators may also be such that the first solenoid actuator may act on a first magnetic element, and the second solenoid actuator may act on a second magnetic plunger element, the magnetic elements being interconnected via lever mechanisms, and/or gear mechanisms in force-transmitting manner, in order to thereby achieve a combination of the generated forces, the combined forces being transmitted to an actuating element. If a plurality of solenoid actuators are realized in physically separate form, then they may act on, for example, a continuous actuating element, which simultaneously has magnetic properties, in order to achieve a combined action of the individual generated magnetic forces in this manner. In particular, a first solenoid actuator may be provided directly next to a second solenoid actuator, or both solenoid actuators may be provided as windings positioned concentrically with respect to each other, a shared magnetic section, in which the generated magnetic fields are combined in order to be supplied to a pole, at which a movable actuating element in turn is situated, extending through the longitudinal axes of both solenoid actuators.

In principle, the magnetic fields generated by the individual solenoid actuators may be combined with the aid of a magnet yoke, or they may be converted into individual forces, which are combined into a shared, magnetically generated force by force-transmitting connections.

In example embodiments, the plunger relay includes a movable actuating element, having a magnetic section, and the magnetic forces of the first and the second solenoid actuator act on this magnetic section. To this end, for example, the magnetic force of the first magnet may be combined with the magnetic force of the second solenoid actuator in that they are situated on a shared magnet yoke. One end or both ends of the magnet yoke may then be provided in the vicinity of or on a magnetic section of the actuating element, the magnetic force causing a decrease in an air gap provided between the actuating element and the pole of the yoke. The actuating element may transmit this force to the pinion, via a lever, for example, in order to move it.

In example embodiments of the present invention, the first and the second solenoid actuator are developed as at least partially concentric windings that enclose a yoke. As an alternative, the concentric windings may enclose the movable actuating element.

In example embodiments, the first solenoid actuator is situated next to a second solenoid actuator and/or an additional solenoid actuator, each solenoid actuator being realized in the form of windings that are wound around the yoke. Instead of the yoke, the solenoid actuators situated next to each other may also enclose the actuating element.

To subdivide the solenoid actuators from the electric point of view, they may be implemented as a continuous winding, which has one or more taps. The taps are used as electrical subdivisions of the entire winding into individual winding sections, which realize the first, second and additional solenoid actuators. As an alternative, the electric subdivision of the solenoid actuators may also be provided by individual windings that are separate from each other and whose ends are able to be connected to a switchable current supply in each case. In the case of a continuous winding having a tap, the switchable current source may be connected to one winding end and a tap, a tap and an additional tap, and/or to both ends of the continuous winding. To set the magnetic force to be generated, the entire winding may be energized in this manner, provided the current source is connected to the two ends of the winding, in order to generate a high lifting force, whereas the generated lifting force is reduced if the current source is connected to one winding end and one tap or to two taps, since current is applied only to a portion of the entire winding.

In example embodiments, the plunger relay also includes at least one NTC (negative temperature coefficient) element whose resistance drops with rising temperature. The NTC element is preferably connected in series between a current source and the winding, i.e., between the current source and one of the winding ends, or between the current source and a tap.

In general, it is also possible to use a voltage source instead of a current source. Furthermore, one winding element may be short-circuited with one tap, and/or two taps with each other, so that the particular winding section lying in-between is no longer available for the force generation. In the case of a voltage source, the current that is that is flowing through is then increased, which causes the entire generated magnetic force to vary. In the case of a current source delivering a constant current, only one section of the winding is energized because of the short-circuiting, and the short-circuited winding section does not generate any magnetic force, which makes it possible to reduce the magnetic force in a suitable manner. In the same way, it is possible to increase the magnetic force by resolving such a short circuit in that more winding sections are supplied with current than in the case of a short-circuit. To modify the overall lifting force, the wiring of the solenoid actuators may be changed, i.e., from serial to parallel and vice versa.

The NTC element may also be connected to the current supply or to the voltage supply and the solenoid actuators in a different manner, the NTC element preferably including the temperature of the winding section into whose current supply it has been switched. As an alternative, it is possible that the NTC element is not switched into the direct current supply of the solenoid actuators but connected to a control, which provides the current supply and/or the voltage supply of the particular solenoid actuators.

Furthermore, example embodiments of the present invention provide a method for actuating a clutch, in which the solenoid actuator device is provided with at least two winding sections, which are able to be energized separately from one another in order to thereby adjust the generated overall magnetic force by separate energization of the particular winding sections in the manner described above.

In example embodiments of the method, the actuation of the clutch includes the supply of current and/or voltage to a number of winding sections, the number of winding sections increasing during the startup phase. Therefore, only one of the two winding sections is able to be supplied with current in a first section of the startup phase, whereas both winding sections, i.e., the entire winding, are/is supplied with current in a second phase of the startup operation. This causes the solenoid actuator device to produce a higher magnetic force in the second phase than in the first phase, which prevents knocking and thereby reduces the noise generation. As an alternative, initially a higher lifting force may be produced according to the energization, which is followed by a phase having a lower lifting force, the number of energized solenoid actuators being modified accordingly.

Example embodiments of the present invention provide a starter for a combustion engine of a motor vehicle, which includes a plunger relay, an electric starter motor and a clutch that connects the electric starter motor to the combustion engine, and the plunger relay actuates the clutch, the plunger relay having at least two winding sections or solenoid actuators able to be supplied with current separately from each other, which are able to be supplied with electric power in the manner described above.

The method according to example embodiments of the present invention is preferably implemented by a control device, which is able to output two different output signals with corresponding timing in order to reduce the desired increase or decrease in the lifting force for an end phase of the starting operation, i.e., in a second phase. The control device thus forms the complementary component to the afore-described lifting plunger, whose function implements example embodiments of the present invention is based in conjunction with the control. The output signals of the control device may be serial digital or analog control signals for a power output stage which controls the plurality of winding sections of the solenoid actuator appropriately. As an alternative, the control device may also emit output signals that have sufficient electric power to supply the solenoid actuators with current directly. In the second starting phase (or in the first starting phase) the control device may alternatively also connect a winding section whose effect is opposite to the effect of additional solenoid actuators and which thereby reduces the overall lifting force by partial compensation.

It is preferred if the control device has at least two outputs, which supply the two solenoid actuators with current separately from each other or which, alternatively, control separate power output stages of the solenoid actuators according to the desired method.

In example embodiments, the control device is able to be realized by monostable flip-flops whose time constants define the energizing phases of the individual solenoid actuators. As an alternative, the control device is also able to receive signals from sensors which determine the position of an actuating element of a clutch and thereby reduce the overall magnetic force in the manner described above once a particular position has been reached, for example. Furthermore, the control device may be provided as computing unit having a program memory, e.g., as microcontroller having an electric memory. In addition, the control device may be realized by a part of an overall motor vehicle control, e.g., in the form of a routine, program or program section of the software that controls the operation of the motor vehicle in cooperation with the hardware of the overall motor vehicle control.

The control device preferably also controls the energization of an electric motor whose rotation power for starting a combustion engine is transmitted to the electric motor in a manner controlled via the clutch.

According to example embodiments of the present invention, the plunger relay is connected to an electric power source, and sensors are provided, which detect the current and/or the voltage flowing in one solenoid actuator or a plurality of the solenoid actuators and/or in one winding section or a plurality of winding sections, or being applied there. Since the movement of the actuating element in an inductive regeneration generates a voltage in the solenoid actuators and/or the winding sections, it is possible to use the acquired current or voltage values for the control by utilizing them to determine the instant(s) at which the overall magnetic force is to be modified or set according to a desired setpoint value. In example embodiments, a sensor winding is used, which is situated at the solenoid actuators, at the winding sections and/or at the movable actuating element, in order to determine the movement of the actuating element and/or the magnetic coupling between solenoid actuator and actuating element via the voltage induced in the sensor winding.

In the control of the solenoid actuators, e.g., by the control device, it is also possible to consider the temperature, which is detected via an NTC element, in order to compensate the temperature-dependent behavior of the solenoid actuators, preferably by modifying the length or the start instants and the instants of the first and second phase of the startup operation. Since the internal resistance and thus the generated lifting force changes with the temperature, this makes it possible to provide the overall lifting force temperature independently.

In example embodiments, the plunger relay includes a solenoid actuator or a winding section that, when energized, generates a lifting force that is sufficient for the complete coupling of a starter motor to a combustion engine. In order to achieve a higher lifting force in the beginning, an additional solenoid actuator may be connected; if it malfunctions, the magnetic force of the first solenoid actuator is sufficient for the complete coupling. The additional solenoid actuator is preferably likewise configured in such a way that it generates a magnetic force that is sufficient for the complete coupling. This produces a redundancy, which permits the startup of the combustion engine even when one solenoid actuator or one winding section is not available.

As a further safety measure, each solenoid actuator or each winding section may have a separate supply feed, so that in an operation in the engine compartment in which the supply feed can also be omitted, a minimum lifting force is ensured even if one supply line is malfunctioning. In one further development, the engine electronics of the motor vehicle controls the triggering of the startup operation, and an additional separate start-stop control device implements the individual control of the solenoid actuators. The start-stop control device may preferably be triggered by an additional triggering mechanism, so that the starting function is still ensured even when the engine electronics malfunctions. In the same way the start-stop control device is able to be bridged with the aid of an external control, so that the engine electronics control the solenoid actuators directly. This ensures that the combustion engine is able to be started even without the afore-described two- or multi-stage control of the solenoid actuators.

In example embodiments, in a first starting phase during which a lower lifting force is generated for the engaging, for instance by energizing only a portion of the available solenoid actuators, than in a second, subsequent phase in which a high lifting force is generated by energizing all installed solenoid actuators, in order to position the pinion securely.

Furthermore, a plurality of consecutive phases is possible in which the number of energized solenoid actuators is provided in accordance with a setpoint force.

Exemplary embodiments of the present invention are depicted in the drawing and described in greater detail in the description below.

DETAILED DESCRIPTION

Figure 1:
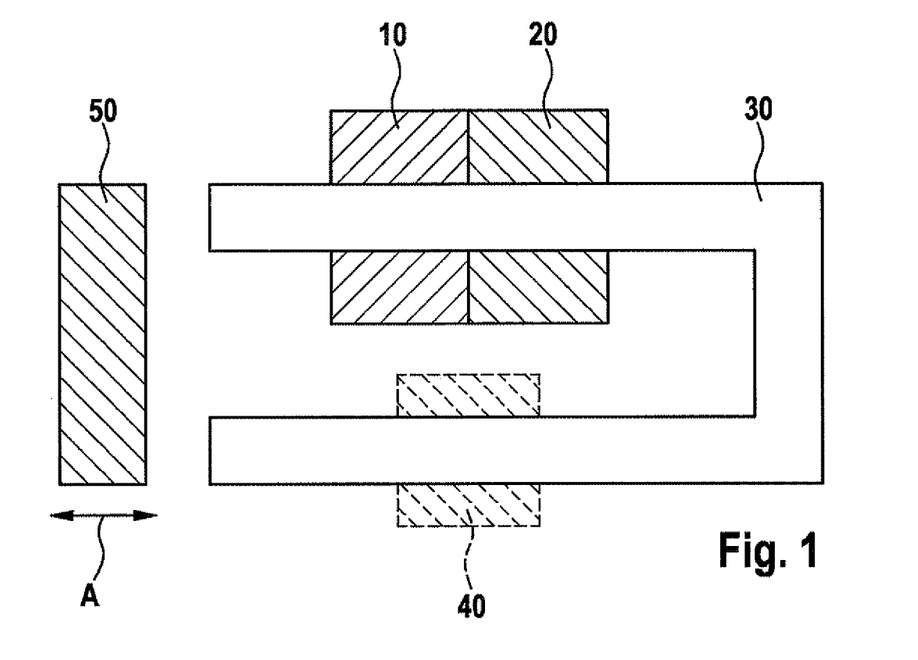
FIG. 1 is a block diagram of the plunger relay according to an example embodiment of the present invention.

FIG. 1 shows a basic representation of the plunger relay according to an example embodiment of the present invention. The plunger relay includes a first solenoid actuator 10 and a second solenoid actuator 20, which are wound next to each other around a yoke 30. Yoke 30 includes one side that has the same longitudinal axis as the two cylindrically shaped solenoid actuators 10 and 20. First solenoid actuator 10 directly abuts second solenoid actuator 20, but it is also possible for a gap to exist between these two. Yoke 30 is made of a material that has high relative magnetic permeability and which thus collects the magnetic field generated by first solenoid actuator 10 and second solenoid actuator 20. The yoke includes a second side, which forms a U-shape with the first side via a crosspiece. The second side is enclosed by an additional third magnet 40 whose magnetic field likewise acts on yoke 30. Shown at the open end of the U-shaped yoke is a movable actuating element 50, which has magnetic properties as well and thus is moved toward the open ends of the yoke when one actuator or all solenoid actuators is/are activated, the open ends forming the magnetic poles in this case.

The plunger relay shown in FIG. 1 therefore has a first magnet 10 and at least one second magnet 20 or 30, whose magnetic field is collected by a yoke. The collected magnetic field is then converted into a joint lifting force at the open ends of the yoke in the vicinity of actuating element 50. In FIG. 1 the solenoid actuators do not envelop the movable actuating element itself but enclose a yoke instead, which acts as bus bar for the generated magnetic fields. The collective lifting force shifts movable actuating element 50 in a direction A relative to yoke 30.

First solenoid actuator 10 and second solenoid actuator 20 may be provided from one winding, the first solenoid actuator being separated from the second by a tap. As an alternative, first solenoid actuator 10 may be wound separately from second solenoid actuator 20, so that each of the two solenoid actuators has two winding ends, which are routed to the outside and are able to be connected to a current control separately from one another.

Figure 2:
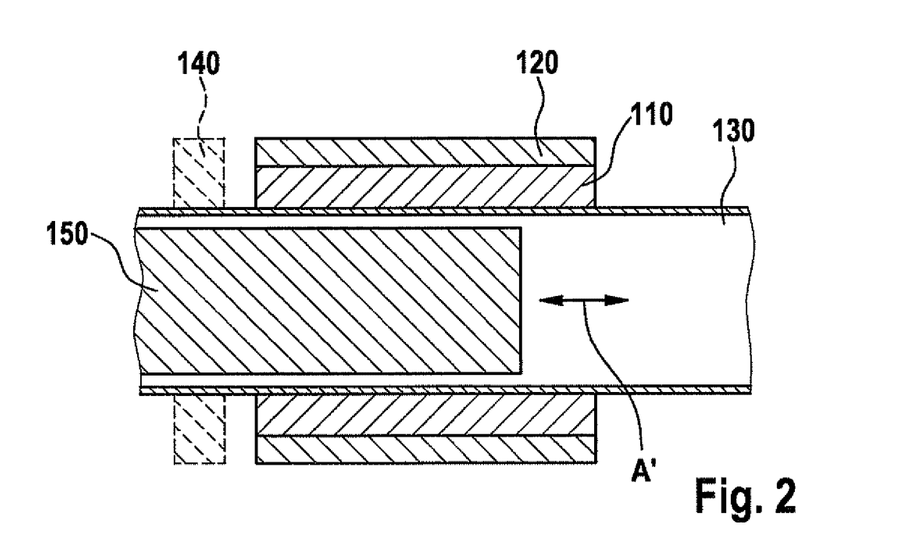
FIG. 2 is a block diagram of the plunger relay according to an example embodiment of the present invention.

FIG. 2 shows a basic representation of a plunger relay according to an example embodiment of the present invention. The plunger relay includes a first solenoid actuator 110 and a second solenoid actuator 120, which are situated around a shared cylindrical space 130 as concentric windings or winding sections. An actuating element 150 on which both solenoid actuators 120, 110 are acting because of their placement is provided in space 130. The construction of the development illustrated in FIG. 2 thus provides a combination of the magnetic forces produced by the two solenoid actuators. This principle is contrary to the plunger relay from FIG. 1, in which the magnetic fields were merely added and then were jointly converted into a shared lifting force with respect to the actuating element. In the specific development shown in FIG. 2, the plunger relay also includes an additional solenoid actuator 140, which is provided as additional solenoid actuator. Basically, it should be noted that the present invention may also be realized without additional solenoid actuators 140, 40.

The individual magnetic forces produced by solenoid actuators 110, 120 and 140 lead to a movement of movable actuating element 150 in a direction A'.

Solenoid actuators 110, 120 and 140 are provided as windings which are concentrically wound around a cylindrical space, first solenoid actuator 110 and second solenoid actuator 120 being able to be provided as two separate windings, which are wound on top of one another, or as one continuous winding, which is subdivided into two electrically separate winding sections by a tap, thereby providing the first and the second solenoid actuator. Additional solenoid actuator 140 is provided at an axial offset to the first and the second solenoid actuator, but it may also be provided at the same level as solenoid actuators 120 and 110 (not illustrated).

Movable actuating elements 50, 150 are provided to actuate a clutch, so that a starter electromotor is selectively coupled, or not coupled, with a pinion of a combustion engine by the movement in the direction A or A'.

Figure 3:
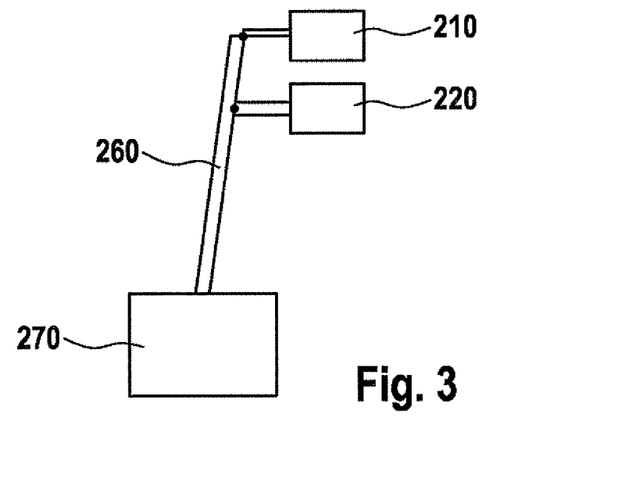
FIG. 3 is a block diagram of a system of solenoid actuators according an example embodiment of to the present invention, on an actuating element of a clutch.

FIG. 3 illustrates in a basic representation a solenoid actuator device according to an example embodiment of the present invention, which includes two physically separate solenoid actuators. A first solenoid actuator 210 and a second solenoid actuator 220 each have movable actuating elements, which are connected in force-transmitting manner to an actuating element 260 of a clutch 270 with the aid of a hinge. The overall lifting force of the two solenoid actuators 210 and 220 is first added up in actuating element 260 of clutch 270, so that in the development shown in FIG. 3, the individual magnetic fields are generated separately from each other and converted separately into a mechanical lifting force, the generated lifting forces being combined in actuating element 260 of clutch 270.

The addition of the effects of the solenoid actuators is therefore achieved at the mechanical level, i.e., forces are added in the way it is provided for the device from FIG. 2 as well. However, the development shown in FIG. 1 provides for the combination of the magnetic fields, and the overall fields combined in this manner are jointly converted into a mechanical force that acts on movable actuating element 50. FIG. 2 provides for a mechanical effect on an actuating element at the same location of the actuating element, by both solenoid actuators 110 and 120, whereas in the development shown in FIG. 3, the application of the lifting forces of first and second solenoid actuators 210 and 220 are combined at actuating element 260 of clutch 270. The effect of the development illustrated in FIG. 2 is similar to that of the development shown in FIG. 1 inasmuch as not only the forces but, due to the joint placement, also the electrical fields are added to the same section of actuating element 150.

Despite the different modes of action of the developments shown in FIGS. 1-3, they nevertheless implement the inventive underlying concept according to which the separate selective energization of at least two solenoid actuators leads to different, selectable force levels by which a movable actuating element is moved, either the plunger relay or the clutch. Thus, different force components are generated by different windings or solenoid actuators or winding sections, which lead to a multi-stage actuation of a clutch. In this context multi-stage means that different degrees of actuating force are generated due to the separable activation or energization of the different solenoid actuators.

Figure 4:
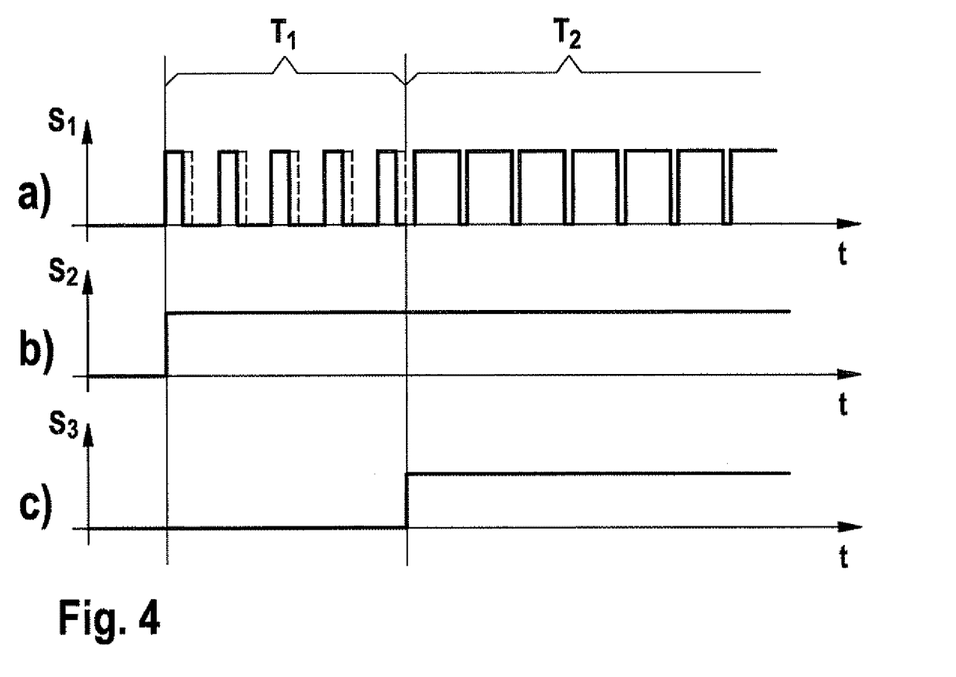
FIGS. 4a-4c are time representations of the activation of solenoid actuators, FIG. 4a showing the related art, and FIGS. 4b and 4c showing the method according to example embodiments of the present invention.

In FIGS. 4a-4c the control signals of example embodiments of the present invention (4b, 4c) are compared to the control signals according to the related art (FIG. 4a).

The generated magnetic force is modified by pulse-width modulation in FIG. 4a. During a beginning phase $T_1$ the actuating element is actuated using a first force, which is lower than the actuating force during an end phase $T_2$. To control the output in the afore-described related art, which is reproduced by FIG. 4a, an individual solenoid actuator is triggered during instant $T_1$ using a low pulse-duty factor in order to generate a smaller force in this manner. To generate a greater force during the ensuing end phase $T_2$, the pulse-duty factor is increased in order to thereby provide a higher force.

In contrast, according to example embodiments of the present invention current is applied only to a first solenoid actuator during first phase $T_1$, i.e., using a direct current or an alternating current having a constant effective power, i.e., $S_2$, while a second solenoid actuator remains without current (cf. $S_3$, FIG. 4c). During second phase $T_2$, both solenoid actuators are supplied with current, i.e., signals $S_2$ and $S_3$ have a value that is greater than zero. This consequently produces a higher overall effective force since the effect of both solenoid actuators is added up.

As an alternative, it is possible to generate a higher force during a first phase in that both $S_2$ and $S_3$ assume a value that is greater than zero, whereas a lower force is to be generated in the second phase in that only one of the signals $S_2$ or $S_3$ is greater than zero.

For example, signals $S_1$, $S_2$ and $S_3$ stand for an applied voltage, e.g., a direct voltage or alternating voltage, having a constant peak amplitude which is proportional to the illustrated signal amplitude.

Figure 5:
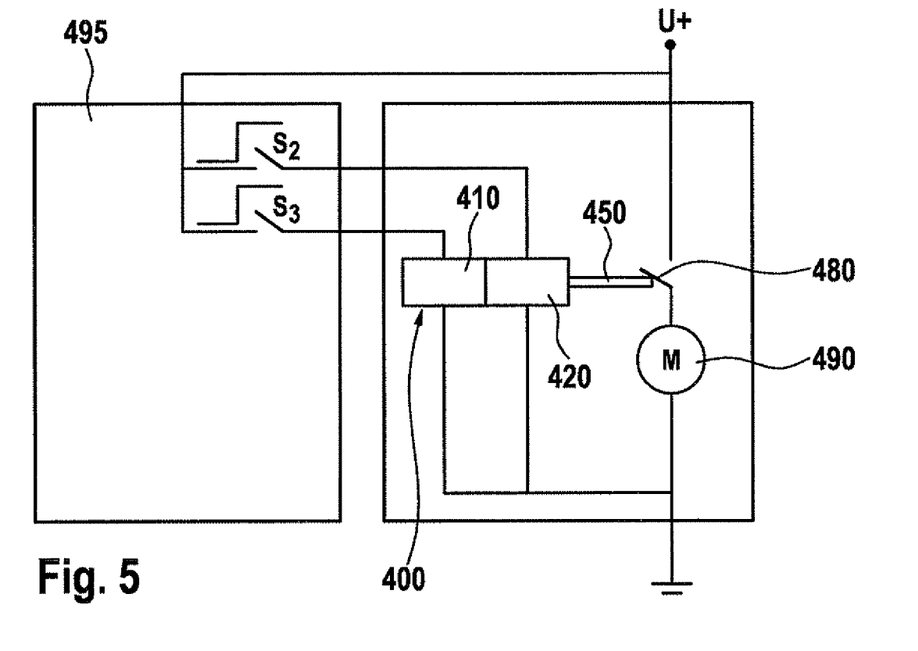
FIG. 5 shows a first wiring variant according to an example embodiment of the present invention.

FIG. 5 shows a switching example of the solenoid actuators in combination with the electric motor, which is used to generate the rotary power required for the startup operation of the combustion engine. Plunger relay 400 includes a first solenoid actuator 410 and a second solenoid actuator 420. Both solenoid actuators jointly actuate movable actuating element 450, which is used to actuate a clutch (not shown). At the same time, movable actuating element 450 closes a switch 480 in response to one solenoid actuator or both solenoid actuators being activated, which causes electric motor 490 to be connected to a voltage source. This voltage source is also used to supply first solenoid actuator 410 and second solenoid actuator 420, which are controlled individually via switches $S_2$ and $S_3$. The control sequence of switches $S_2$ and $S_3$ is shown in FIGS. 4b and 4c, the amplitude illustrated in FIGS. 4b and 4c corresponding to the current that is flowing through the particular switch.

Figure 6:
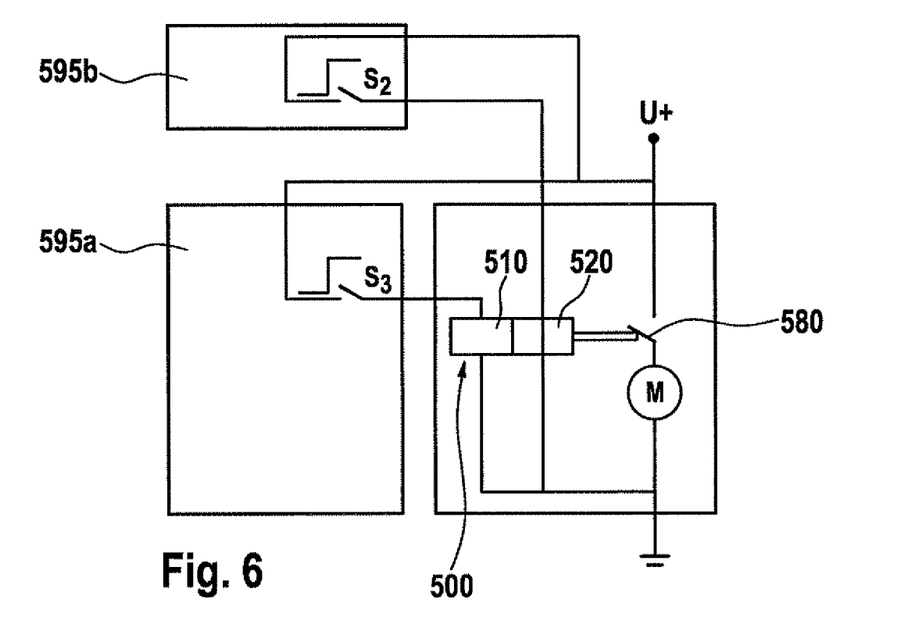
FIG. 6 shows a second wiring variant according to an example embodiment of the present invention.

FIG. 6 shows an alternative wiring of the plunger relay according to an example embodiment of the present invention. The circuit shown in FIG. 6 includes a solenoid actuator 500, which has a first solenoid actuator 510 and a second solenoid actuator 520. According to the present invention, the two solenoid actuators are able to be supplied with current separately, a first switch $S_2$ selectively supplying second solenoid actuator 520 with a supply voltage, and a second switch $S_3$ supplying first solenoid actuator 510 with a supply voltage.

When comparing the example embodiment shown in FIG. 5 with the example embodiment shown in FIG. 6, in the development shown in FIG. 5 both switches are accommodated in a joint control device, which may either be provided separately from a motor electronic system of a motor vehicle or which may be part of it. In contrast, in the illustration shown in FIG. 6, switch $S_3$ is situated in a control device 595a, whereas switch $S_2$ is provided in an engine control 595b. Engine control 595b preferably is in connection with control device 595a in order to supply plunger relay 500 with current according to the mode of action of the present invention described above. Since switch $S_2$ is accommodated in a control device (motor electronic system 595b) in the circuit shown in FIG. 6, which control device is separate from control device 595a in which switch $S_3$ is provided, and because of the consequently separate feed lines, a certain redundancy results for the control of plunger relay 500 in the event of a malfunction of motor control system 595b or control device 595a.

Switches $S_2$ and $S_3$ shown in FIGS. 5 and 6 may be electrical relays, MOSFET transistors, bipolar transistors, thyristors, triacs or in general power electronics whose switching state is able to be influenced by external control signals. Switch 480 (FIG. 5) or switch 580 (FIG. 6) preferably is a switch whose switching state changes due to the position of the movable actuating element of the clutch. Preferably, switch 480 or 580 is designed and positioned to transition from the open state into the closed state once the actuating element has reached a specific position which corresponds to a specific closing degree of the clutch.

The plunger relay and the method are preferably provided for actuating a clutch in a starter for motor vehicles whose drive includes a combustion engine that is started by the starter.

What is claimed is:

1. A plunger relay, comprising:
    a movable actuating element on which a first solenoid actuator is actable in a force-transmitting manner; and
    at least one second solenoid actuator, which is actable on a same movable actuating element in a force-transmitting manner, and whose magnetic force is able to be set independently of a magnetic force of the first solenoid actuator;
    wherein the first solenoid actuator and the second solenoid actuator are each arranged as an individual winding section of a continuous winding, which has a tap that separates the winding section of the first solenoid actuator from the winding section of the second solenoid actuator.

2. The plunger relay according to claim 1, wherein the actuating element includes a magnetic section, and both the magnetic force of the first solenoid actuator and the magnetic force of the second solenoid actuator is actable on the magnetic section of the actuating element.

3. The plunger relay according to claim 1, wherein the first solenoid actuator and the second solenoid actuator are arranged as windings, which are at least partially concentric with respect to each other.

4. The plunger relay according to claim 1, wherein the first solenoid actuator and the second solenoid actuator are each arranged as a winding that has two electrically connectable ends.

5. The plunger relay according to claim 1, further comprising:
    at least one NTC (negative temperature coefficient) element which is inserted into a current supply of at least one of (a) the first and (b) the second solenoid actuator and positioned to detect a temperature of at least one of (a) the first and (b) the second solenoid actuator.

6. The plunger relay according to claim 1, wherein the actuating element includes a magnetic section, and both the magnetic force of the first solenoid actuator and the magnetic force of the second solenoid actuator is actable on the magnetic section of the actuating element, and wherein the first solenoid actuator and the second solenoid actuator are arranged as windings, which are at least partially concentric with respect to each other.

7. The plunger relay according to claim 6, further comprising:
    at least one NTC (negative temperature coefficient) element which is inserted into a current supply of at least one of (a) the first and (b) the second solenoid actuator and positioned to detect a temperature of at least one of (a) the first and (b) the second solenoid actuator.

8. The plunger relay according to claim 1, wherein the actuating element includes a magnetic section, and both the magnetic force of the first solenoid actuator and the magnetic force of the second solenoid actuator is actable on the magnetic section of the actuating element, and wherein the first solenoid actuator and the second solenoid actuator are each arranged as a winding that has two electrically connectable ends.

9. The plunger relay according to claim 8, further comprising:
at least one NTC (negative temperature coefficient) element which is inserted into a current supply of at least one of (a) the first and (b) the second solenoid actuator and positioned to detect a temperature of at least one of (a) the first and (b) the second solenoid actuator.

10. The plunger relay according to claim 1, wherein the first solenoid actuator and the second solenoid actuator are arranged as windings, which enclose at least one of (a) a yoke having at least one end situated at the movable actuating element and (b) the movable actuating element.

11. A method for actuating a clutch with the aid of a magnetic force generated by a solenoid actuator device, the method comprising:
providing the solenoid actuator device with one continuous winding having at least two winding sections;
generating the magnetic force by the winding sections when energized; and
separately energizing the winding sections.

12. The method according to claim 11, wherein the actuation of the clutch includes the supply of current to a number of winding sections, the number increasing or decreasing over a time interval.

13. A starter for a combustion engine of a motor vehicle, comprising:
a plunger relay, wherein the plunger relay includes a movable actuating element on which a first solenoid actuator is actable in a force-transmitting manner, and at least one second solenoid actuator, which is actable on a same movable actuating element in a force-transmitting manner, and whose magnetic force is able to be set independently of a magnetic force of the first solenoid actuator;
an electric starter motor; and
a clutch;
wherein the plunger relay is connected to the clutch for actuation, and the clutch supplies rotary power generated by the electric starter motor to the combustion engine as a function of the actuation, and
wherein the first solenoid actuator and the second solenoid actuator are each arranged as an individual winding section of a continuous winding, which has a tap that separates the winding section of the first solenoid actuator from the winding section of the second solenoid actuator.

14. The starter according to claim 13, wherein the plunger relay includes at least one NTC (negative temperature coefficient) element which is inserted into a current supply of at least one of (a) the first and (b) the second solenoid actuator and positioned to detect a temperature of at least one of (a) the first and (b) the second solenoid actuator.

15. A control device for a starter of a combustion engine, comprising:
a control arrangement which is arranged to output at least two different output signals, by which at least two different solenoid actuators of the starter, which act on a same actuating element, are able to be controlled independently of each other, wherein the starter includes:
a plunger relay, wherein the plunger relay includes a movable actuating element on which a first solenoid actuator is actable in a force-transmitting manner, and at least one second solenoid actuator, which is actable on a same movable actuating element in a force-transmitting manner, and whose magnetic force is able to be set independently of a magnetic force of the first solenoid actuator;
an electric starter motor; and
a clutch;
wherein the plunger relay is connected to the clutch for actuation, and the clutch supplies rotary power generated by the electric starter motor to the combustion engine as a function of the actuation.

\* \* \* \* \*

UNITED STATES PATENT AND TRADEMARK OFFICE
CERTIFICATE OF CORRECTION

PATENT NO.       : 8,544,437 B2                                              Page 1 of 1
APPLICATION NO. : 12/594086
DATED            : October 1, 2013
INVENTOR(S)      : Heusel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this
Fifteenth Day of September, 2015

Michelle K. Lee
*Director of the United States Patent and Trademark Office*